United States Patent [19]
Gullett et al.

[11] Patent Number: 5,647,504
[45] Date of Patent: Jul. 15, 1997

[54] LASER WELDED FLUID FILTER HOUSING

[75] Inventors: David F. Gullett, Peoria; Ronald T. Taylor, Morton; Daniel J. Techtow, Danville, all of Ill.

[73] Assignee: Caterpillar Inc., Peoria, Ill.

[21] Appl. No.: 506,734

[22] Filed: Jul. 26, 1995

[51] Int. Cl.$^6$ ........................................ B01D 27/08
[52] U.S. Cl. .................... 220/612; 220/634; 220/638; 210/435
[58] Field of Search ........................... 210/232, 435, 210/446, 448, 449, DIG. 17; 220/611, 612, 634, 638, 640

[56] References Cited

U.S. PATENT DOCUMENTS

| | | | |
|---|---|---|---|
| 2,057,347 | 10/1936 | Reed | 220/638 |
| 4,410,430 | 10/1983 | Hagler, Jr. | 210/446 |
| 4,854,467 | 8/1989 | Budenbender | 220/612 |
| 4,855,047 | 8/1989 | Firth | 210/232 |

*Primary Examiner*—Matthew O. Savage
*Attorney, Agent, or Firm*—Pankaj M. Khosla; Frank L. Hart

[57] ABSTRACT

A fluid filter, such as an oil filter for example, has a canister, a top plate and a sealing ring. The sealing ring overlaps portions of the top plate and canister. The sealing ring and canister are joined one to the other by laser welding about the sealing ring adjacent the canister and forming a mechanical lock between the canister and the top plate by mixing of materials.

4 Claims, 1 Drawing Sheet

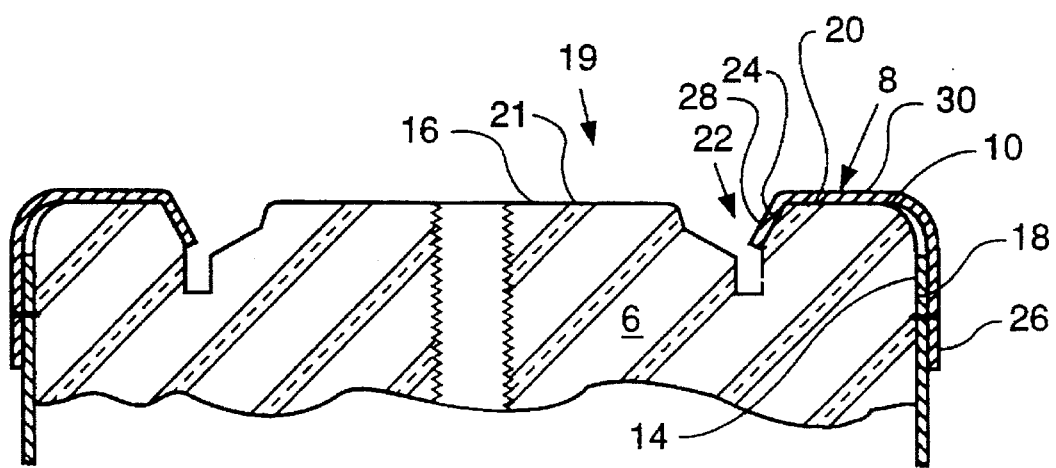
Fig_1_
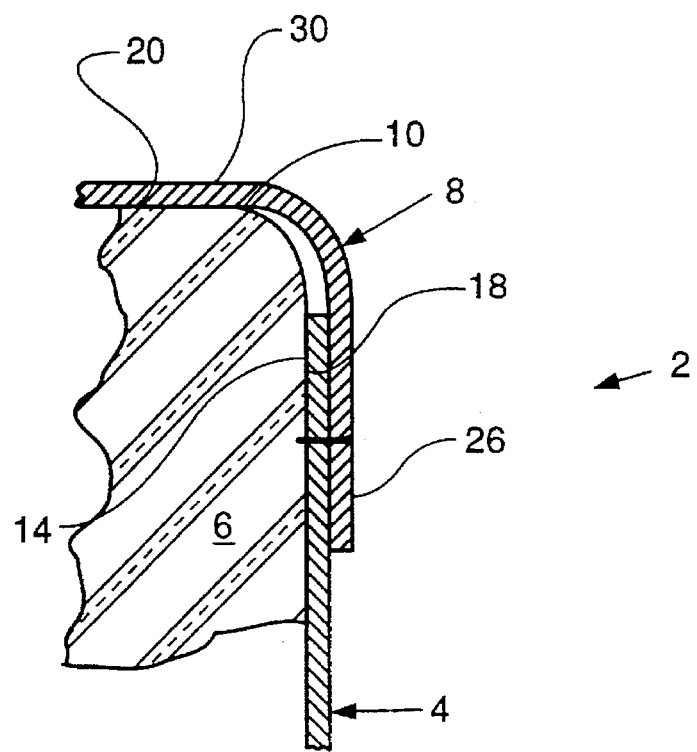
Fig_2_

LASER WELDED FLUID FILTER HOUSING

TECHNICAL FIELD

The present invention relates to fluid filters and more particularly to the construction and the laser welding of the filter portions together.

BACKGROUND ART

There are a multiplicity of constructions of fluid filters, such as oil filters. Such filters are well known in the art and contain a filtering material within a canister, a top plate closing one end of the canister, and fluid pathways for passing fluid into the filter, through the filtering material and back to an associated engine. Each of the heretofore filters seem to have weakness and problems such as cracking, complexity and/or represent a waste of labor, time, materials and national resources.

The present invention is directed to overcome one or more of the problems as set forth above.

DISCLOSURE OF THE INVENTION

In one aspect of the invention, the fluid filter has a cylindrical metal canister, a top plate and a sealing ring. The metal canister has a first end and a first end portion. The first end is open. The top plate has a first surface, and edge portion, and a first surface portion of ring configuration. The top plate is inserted within the first end portion opening of the canister. The sealing ring extends about and covers the first end portion of the canister and the first surface portion of the top plate. The sealing ring is laser welded to the canister first end portion and connects the top plate edge portion, the canister first end portion and the sealing ring.

BRIEF DESCRIPTION OF THE DRAWINGS

FIG. 1 is a partial diagrammatic view in section of the filter of this invention; and FIG. 2 is an enlarged view of a portion of the filter showing the effects of laser welding about the sealing ring of the filter.

BEST MODE FOR CARRYING OUT THE INVENTION

For purposes of brevity, only a portion of the filter has been shown and described in view of the fact that their general appearance is so well known.

Referring to FIGS. 1 and 2, a fluid filter 2 is shown which includes the elements of this invention. The filter has a cylindrical metal canister 4, a top plate 6 and a sealing ring 8. The metal canister 4 has a first end 10 and a first end portion 14 that is open. The top plate 6 has a first surface 16, an edge portion 18 and a first surface portion 20 of ring configuration. The top plate 6 is generally cylindrical and is inserted within the first end portion opening of the canister 4.

The sealing ring 8 extends about and covers the first end portion 10 of the canister 4 and the first surface portion 16 of the top plate 6. The sealing ring is laser welded to and about the canister first end portion 14 thereby connecting the top plate edge portion 18, the canister first end portion 14 and the sealing ring 8.

Referring particularly to FIG. 2, it can be seen that by laser welding on the canister sealing ring 8 about the periphery thereof, the metal, preferably steel, of the sealing ring flows into and bonds with the metal, preferably steel, of the canister first end portion 14.

The process of laser welding cause the metal of at least the canister 4 to be forced into the metal of the top plate 6 which preferably is aluminum. Laser welding about the outer periphery of the sealing ring 8 therefore connects the sealing ring 8 to the canister first end portion 14, and mechanically locks the canister first end portion 14 to the top plate 6. The laser weld preferably is uninterrupted and extends circumferentially about the sealing ring 8, materials from the first end portion 14 of the canister 4 and the edge portion 18 of the top plate 6 are mixed, thereby providing an antirotational mechanical lock through the formed joint.

In the preferred embodiment shown in FIG. 1, a circular groove 22 extends about the surface 19 of the top plate 6 defining first and second surface portions 20,21 on the surface 19 of the top plate 6. The groove 22 has an outer edge 24. This outer edge 24 of groove 22 forms an inner edge of the top plate first surface portion. The groove 22 can be of various configurations without departing from this invention.

The sealing ring has first and second end portions 26,28 and a middle portion 30. As set forth above, the first end portion 26 is laser welded to the canister first end portion 14. The middle portion 30 of the sealing ring 8 covers the first surface portion 20 of the top plate 6 and the second end portion 28 of the sealing ring 8 extends into the circular groove 22 of the surface 19 of the top plate 6.

The sealing ring 8 is stamped to ensure contact with the first end portion 14 of the canister 4 and the first surface portion 20 of the top plate 6. In the groove 22, a portion of the sealing ring 8 is stamped to ensure contact with the outer edge 24 of the groove 22.

INDUSTRIAL APPLICABILITY

By so construction the filter of this invention, the parts forming the filter body are easily constructed, the joint connection has greater assurance of being fluid tight, and the assembly and welding can be accomplished without the waste of time, labor, equipment and natural resources.

Other aspects, objects and advantages of this invention can be obtained from a study of the drawings, the disclosure and the appended claims.

We claim:

1. A fluid filter housing, comprising:

a cylindrical metal canister having a first end and a first end portion, said first end being open;

a top plate having a first surface, an edge portion, and a first surface portion of ring configuration, said top plate being inserted within said first end portion of said canister;

a sealing ring extending about and covering the first end portion of said canister and the first surface portion of said top plate;

a circular groove extending about the first surface of said top plate and defining an inner edge of the top plate first surface portion; and said sealing ring having first and second end portions and a middle portion, said first end portion being laser welded to the canister first end portion, said middle portion covering the first surface portion of the top plate, and said second end portion extending into the circular groove of the first surface of the top plate.

2. A fluid filter housing, as set forth in claim 1, wherein said laser weld is uninterrupted and extends circumferentially about said sealing ring, the first end portion of said canister, and the edge of said top plate.

3. A fluid filter housing, as set forth in claim 1, wherein said sealing ring is stamped into forcible contact with the first end portion of said canister and the first surface portion of said top plate.

4. A fluid filter housing, as set forth in claim 1, wherein a portion of said sealing ring is stamped into said groove and in forcible contact with a side wall of said groove.

\* \* \* \* \*